(12) United States Patent
Trim et al.

(10) Patent No.: US 11,037,558 B2
(45) Date of Patent: Jun. 15, 2021

(54) AUDIO MODULATION FOR AN AUDIO INTERFACE

(71) Applicant: International Business Machines Corporation, Armonk, NY (US)

(72) Inventors: Craig M. Trim, Ventura, CA (US); Victor Povar, Vancouver (CA); Gandhi Sivakumar, Bentleigh (AU); Rashida Hodge, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 146 days.

(21) Appl. No.: 16/139,734

(22) Filed: Sep. 24, 2018

(65) Prior Publication Data

US 2020/0098357 A1   Mar. 26, 2020

(51) Int. Cl.
  *G10L 15/22* (2006.01)
  *G10L 15/30* (2013.01)
  *G10L 15/18* (2013.01)

(52) U.S. Cl.
  CPC ......... *G10L 15/22* (2013.01); *G10L 15/1815* (2013.01); *G10L 15/30* (2013.01); *G10L 2015/223* (2013.01)

(58) Field of Classification Search
  CPC ... G10L 15/22; G10L 15/26; G10L 2015/088; G10L 15/08; G10L 2015/223; G10L 15/18; G10L 15/20; G10L 17/02; G10L 17/22; G10L 15/265; G10L 15/04; G10L 15/30; G10L 17/06; G10L 17/12; G10L 17/16;

(Continued)

(56) References Cited

U.S. PATENT DOCUMENTS 6,466,654 B1 * 10/2002 Cooper ................... G10L 13/00
                                                      379/88.01
6,574,600 B1 *  6/2003 Fishman ................ G06Q 40/00
                                                      704/260

(Continued)

FOREIGN PATENT DOCUMENTS

WO    WO2005013233 A1    2/2005

OTHER PUBLICATIONS

Jonsson, "Social and Emotional Characteristics of Speech-based In-Vehicle Information Systems: Impact on Attitude and Driving Behavior," Linkoping Studies in Arts and Science No. 504, 2009, Linkoping, Denmark, 199 pages.

(Continued)

*Primary Examiner* — Matthew H Baker
(74) *Attorney, Agent, or Firm* — Yee & Associates, P.C.

(57) ABSTRACT

A method, apparatus, system, and computer program product for generating an audio communication. An urgency for a user is determined by a computer system in response to detecting a trigger event in a verbal communication from the user. A frequency modulator is selected by the computer system from a plurality of frequency modulators based on the urgency determined to form a selected frequency modulator. A frequency of words in an audio communication is modulated by the computer system using the selected frequency modulator to form a modulated audio communication, wherein the modulated audio communication comprises a natural language response generated in response to the trigger event. The modulated audio communication is sent by the computer system to an audio output device.

18 Claims, 8 Drawing Sheets

(58) Field of Classification Search
CPC ......... G10L 2015/025; G10L 2015/228; G10L 25/48; G10L 15/01; G10L 15/063; G10L 15/10; G10L 15/16; G10L 17/08; G10L 2015/227; G10L 25/21; G10L 25/51; G10L 15/142; G10L 15/1815; G10L 15/1822; G10L 15/24; G10L 15/285; G10L 21/055; G10L 13/00; G10L 25/78
See application file for complete search history.

(56) References Cited

U.S. PATENT DOCUMENTS

| | | | | |
|---|---|---|---|---|
| 6,757,362 | B1* | 6/2004 | Cooper | H04M 3/527 |
| | | | | 379/88.01 |
| 8,927,847 | B2* | 1/2015 | Chafe | G10H 1/08 |
| | | | | 84/671 |
| 9,476,729 | B2 | 10/2016 | Goldman-Shenhar et al. | |
| 9,493,130 | B2 | 11/2016 | Penilla et al. | |
| 9,672,823 | B2 | 6/2017 | Penilla et al. | |
| 9,761,249 | B2 | 9/2017 | Deleeuw | |
| 2012/0310652 | A1 | 12/2012 | O'Sullivan | |
| 2013/0159861 | A1* | 6/2013 | Rottier | G06F 3/0482 |
| | | | | 715/727 |
| 2014/0074483 | A1* | 3/2014 | van Os | G10L 15/22 |
| | | | | 704/275 |
| 2016/0078862 | A1* | 3/2016 | Joyce | G10L 15/08 |
| | | | | 704/274 |
| 2016/0372110 | A1 | 12/2016 | Waltermann et al. | |
| 2017/0160813 | A1 | 6/2017 | Divakaran et al. | |
| 2020/0020329 | A1* | 1/2020 | Gordon | H04L 63/0245 |

OTHER PUBLICATIONS

Woodie, "Speech-to-Text Puts New Twist on Sentiment Analysis," Datanami, A Tabor Communications Publication, Sep. 3, 2014, 3 pages. https://www.datanami.com/2014/09/03/speech-text-puts-new-twist-sentiment-analysis/.

Kaushik et al., "Sentiment Extraction from Natural Audio Streams," IEEE International Conference on Acoustics, Speech and Signal Processing, May 2013, Vancouver, BC, Canada, pp. 8485-8489.

"MixedEmotions," GitHub, accessed Aug. 29, 2018, 4 pages. https://github.com/MixedEmotions.

* cited by examiner

AUDIO MODULATION FOR AN AUDIO INTERFACE

BACKGROUND

1. Field

The disclosure relates generally to an improved computer system and, more specifically, to a method, apparatus, system, and computer program product for generating audio communications.

2. Description of the Related Art

Virtual assistants have become commonly available to help users perform tasks. The virtual assistants are artificial intelligence (AI) systems that can perform tasks or services for a user. A virtual assistant can use voice queries and a natural language interface to interact with the user through a computing device such as a smart phone, a tablet computer, a personal computer, a smart speaker, or some other type of device. These computing devices are cognitive audio interfaces with which the users can interact.

For example, a virtual assistant can manage a calendar, manage a timer, set an alarm, provide audio instructions for preparing a dish from a recipe, play music, make a to-do list, provide weather information, provide traffic information, deliver audio messages, control smart devices, or perform other tasks. In some situations, the information provided can be more important or urgent than in other situations. For example, a situation in which a user asks for instructions on how to handle a flat tire while driving is more urgent than when a situation in which the user asks for traffic or weather information. Current virtual assistants do not distinguish between situations that have different levels of urgency when receiving requests from users.

SUMMARY

According to one embodiment of the present invention, a method generates an audio communication. An urgency for a user is determined by a computer system in response to detecting a trigger event in a verbal communication from the user. A frequency modulator is selected by the computer system from a plurality of frequency modulators based on the urgency determined to form a selected frequency modulator. A frequency of words in an audio communication is modulated by the computer system using the selected frequency modulator to form a modulated audio communication. The modulated audio communication comprises a natural language response generated in response to the trigger event. The modulated audio communication is sent by the computer system to an audio output device.

According to another embodiment of the present invention, an audio communications system comprises a computer system. The computer system determines an urgency for a user in response to detecting a trigger event in a verbal communication from the user and selects a frequency modulator from a plurality of frequency modulators based on the urgency determined to form a selected frequency modulator. The computer system modulates a frequency of words in an audio communication using the selected frequency modulator to form a modulated audio communication. The modulated audio communication comprises a natural language response generated in response to the trigger event and sends the modulated audio communication to an audio output device.

According to yet another embodiment of the present invention, a computer program product for generating an audio communication comprises a computer-readable storage media with first program code, second program code, third program, and fourth program code stored on the computer readable storage media. The first program code is run to determines an urgency for a user in response to detecting a trigger event in a verbal communication from the user. The second program code, is run to select a frequency modulator from a plurality of frequency modulators based on the urgency determined to form a selected frequency modulator. The third program code is run to modulating a frequency of words in an audio communication using the selected frequency modulator to form a modulated audio communication. The audio communication comprises a natural language response generated in response to the trigger event. The fourth program code is run to send the modulated audio communication to an audio output device.

DETAILED DESCRIPTION

Figure 1:
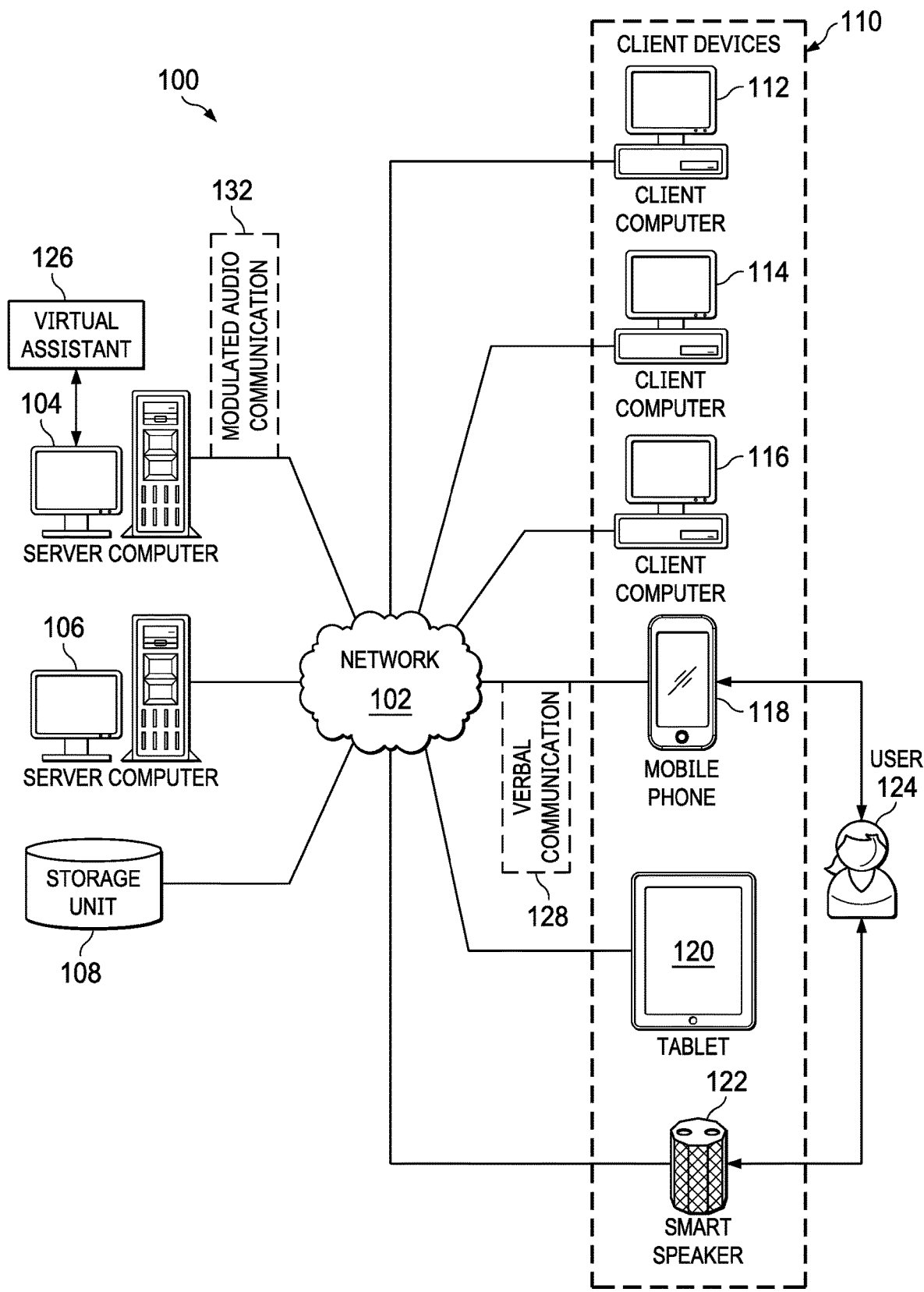
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may run the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative examples recognize and take into account one or more different considerations. For example, the illustrative examples recognize and take into account that currently available virtual assistants do not determine an urgency of a situation. Further, the illustrative examples recognize and take into account that virtual assistants do not modulate the frequency of a response based on the urgency of a situation. For example, the illustrative examples recognize and take into account that current virtual assistants do not modulate a frequency of words in an audio response to a user.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart speaker 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 interacts with virtual assistant 126 in server computer 104 using a client device, such as mobile phone 118 or smart speaker 122. For example, user 124 can make a request in verbal communication 128 that is detected by mobile phone 118. Verbal communication 128 also includes a trigger event that causes processing of verbal communication 128 as a request. For example, user 124 can request a daily briefing in verbal communication 128. Mobile phone 112 sends verbal communication 128 to virtual assistant 126 in server computer 104.

In response, virtual assistant 126 analyses verbal communication 128 to generate a response. In this illustrative example, the response is a natural language response in an audio communication. Additionally, virtual assistant 126 determines an urgency of the situation for user 124. For example, if user 124 has a meeting in 10 minutes, the urgency is higher than if user 124 has a meeting in 2 hours.

With a determination of the urgency for user 124, virtual assistant 126 modulates a frequency of the words in the audio communication to have a frequency based on the urgency of the situation for user 124. The modulation is made using a selected frequency modulator.

For example, the frequency is higher if the meeting is in 10 minutes as opposed to 2 hours. As a result, the frequency or speed at which words are spoken in the natural language response is faster in the audio communication. This modulation of audio communication forms modulated audio communication 132 which is sent to mobile phone 118 and presented to user 124 by a speaker in mobile phone 118.

Figure 2:
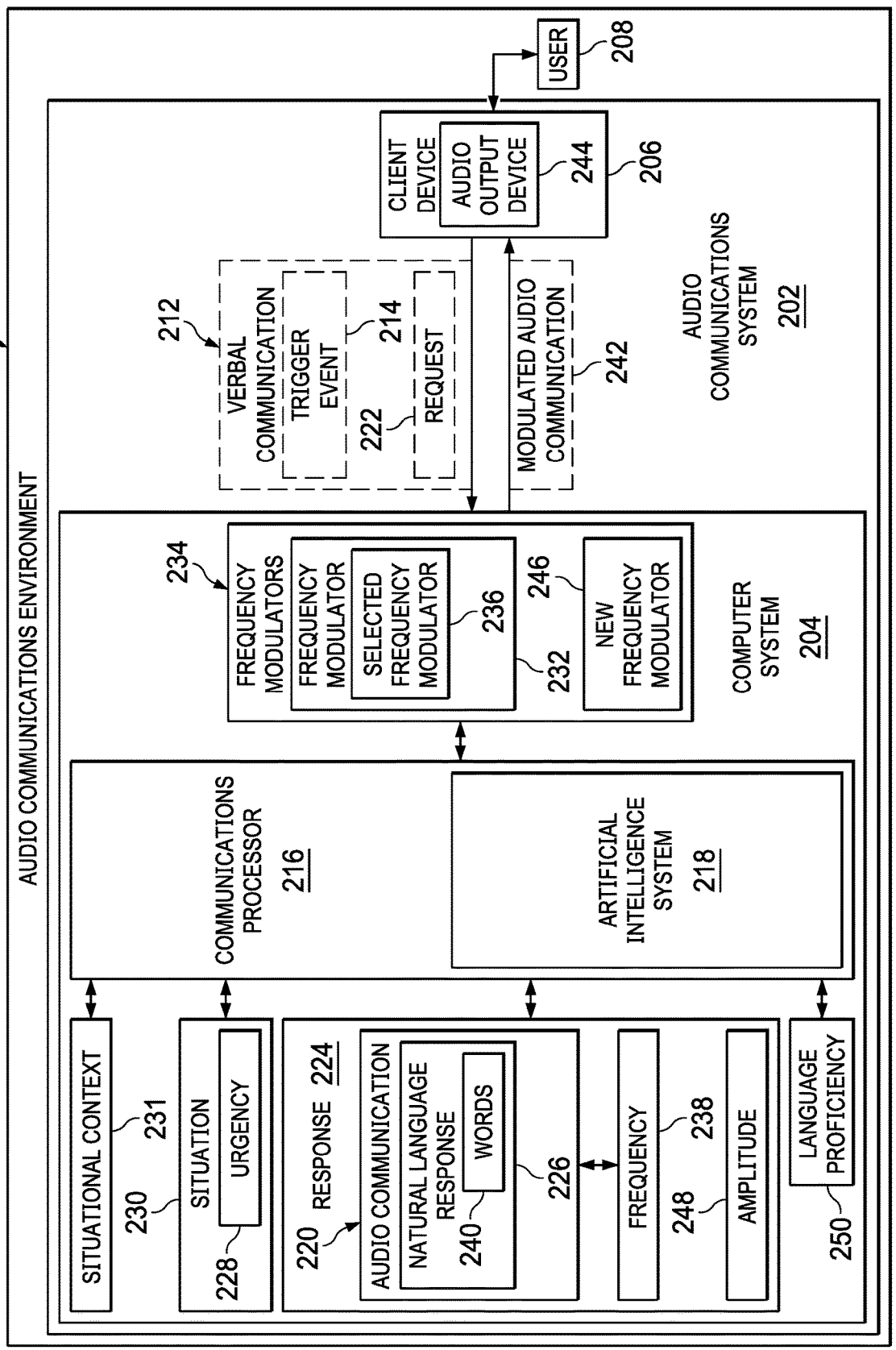
FIG. 2 is a block diagram of an audio communication environment in accordance with an illustrative embodiment.

With reference now to FIG. 2, a block diagram of an audio communication environment is depicted in accordance with an illustrative embodiment. In this illustrative example, audio communications environment 200 includes components that can be implemented in hardware such as the hardware shown in network data processing system 100 in FIG. 1. Network data processing system 100 and the components in network data processing system 100 in FIG. 1 are an example of a network data processing system that can be used in audio communications environment 200.

As depicted, audio communications system 202 in audio communications environment 200 includes computer system 204 and client device 206. Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

In this illustrative example, client device 206 is a hardware system and can include software. Client device 206 can take a number of different forms. For example, client device 206 can be selected from a group comprising a mobile phone, a laptop computer, a tablet computer, smart glasses, a smart speaker, and other suitable devices.

Client device 206 is operated by user 208. In this illustrative, client device 206 detects verbal communication 212 originating from user 208. When trigger event 214 is present in verbal communication 212, client device 206 sends verbal communication 212 to communications processor 216 in computer system 204. Trigger event 214 can take a number of different forms. For example, trigger event 214 is selected from at least one of a key phrase spoken by user 208, an emergency call made by user 208, a wake word spoken by user 208, a gesture made by user 208, or some other suitable input made by user 208.

Communications processor 216 is designed to process verbal communication 212 received from user 208. As depicted, communications processor 216 includes artificial intelligence system 218 which operates to process verbal communication 212 and generate audio communication 220. Verbal communication 212 is what user 208 says or speaks.

Artificial intelligence system 218 is a system that has intelligent behavior and can be based on function of a human brain. Artificial intelligence system 218 comprises at least one of an artificial neural network, a cognitive system, a Bayesian network, a fuzzy logic, an expert system, a natural language system, a cognitive system, or some other suitable system. Machine learning is used to train artificial intelligence system 218. Machine learning involves inputting data to the process and allowing the process to adjust and improve the function of artificial intelligence system 218.

In this illustrative example, natural language processes in artificial intelligence system 218 and communications processor 216 are used to process verbal communication 212. The natural language processes can include at least one of speech recognition, natural language understanding, natural language generation, or other processes used to process verbal communications. Communications processor 216 identifies request 222 within verbal communication 212 and generates response 224. As depicted, response 224 is natural language response 226, which is a response that is in a human language.

Further, communications processor 216 determines urgency 228 for user 208 in response to detecting trigger event 214 in verbal communication 212 from user 208. For example, communications processor 216 determines urgency 228 of situation 230 for user communications processor 216 determines urgency 228 for user 208. In this illustrative example, situation 230 is one or more circumstances for user 208. Situation 230 can also include a location and an environment around user 208.

In this illustrative example, situation 230 can be determined by artificial intelligence system 218. Artificial intelligence system 218 can process verbal communication 212 to identify situation 230. For example, if verbal communication 212 is "I am on the highway and have a flat tire . . . what should I do?", situation 230 is a "flat tire." Subsequent verbal communications relating to the "flat tire" are all considered to be part of situation 230. As another example, the situation can be mowing a yard, swimming in an ocean, staining a fence, playing a chess game, or some other situation.

As depicted, urgency 228 can be identified based on situational context 231 for user 208 in situation 230. In this illustrative example, situational context 231 can include at least one of an environmental context, a temporal context, an emotional context, or other types of context for user 208 in situation 230.

Communications processor 216 can determine situational context 231 from verbal communication 212. Moreover, communications processor 216 can also use other types of information to identify situational context 231. For example, situational context 231 can be determined using at least one of an input interaction rate of user 208, an emotion of user 208 in verbal communication 212 from user 208, a location of user 208, biometric information for user 208, a current time relative to a calendar event for user 208, or some other information about situation 230 for user 208.

The information used to identify situational context 231 can be obtained from a number of different sources. For example, an interaction rate is a number of input requests that user 208 receives over a period of time. This interaction rate can be determined by client device 206 or communications processor 216. In another example, the location of user 208 can be identified using a global positioning in client device 206 in addition to or in place of location information spoken by user 208 in verbal communication 212.

In the illustrative example, a platform that performs motion-based analytics that is in communication with communications processor 216 can perform emotional analysis. As another example, calendar information can be obtained from a calendar server or a work scheduler that is in communication with communications processor 216.

Communications processor 216 generates audio communication 220 which comprises natural language response 226, generated in response to trigger event 214. Communications processor 216 selects frequency modulator 232 to modulate audio communication 220 from a plurality of frequency modulators 234 based on urgency 228 to form selected frequency modulator 236. In the illustrative example, frequency modulators 234 can be implemented using software, hardware, or a combination thereof. For example, frequency modulator 232 can be a circuit that is designed to modulate audio communication 220 to have a selected frequency. In another illustrative example, frequency modulator 232 can be a software process that runs on a hardware processor unit to modulate audio communication 220.

Communications processor 216 modulates frequency 238 of words 240 in audio communication 220 using selected frequency modulator 236 to form modulated audio communication 242. In this illustrative example, frequency 238 of words 240 is the speed at which words 240 are spoken in audio communication 220. For example, as frequency 238 increases, the speed at which words 240 are spoken in audio communication 220 increases. As frequency 238 decreases, the speed at which words 240 are spoken in audio communication 220 decreases.

In this illustrative example, audio communication 220 comprises natural language response 226 generated in response to trigger event 214. Communications processor 216 sends modulated audio communication 242 to audio output device 244 in client device 206. Modulated audio communication 242 can be audio data or a higher level of representation of the audio data for playback by a remote computing device.

As depicted, communications processor 216 selects new frequency modulator 246 from the plurality of frequency modulators 234 when urgency 228 changes for user 208. For example, as situation 230 progresses, urgency 228 for situation 230 can change. In other words, urgency 228 for situation 230 can change over time.

As user 208 speaks, additional verbal communications are generated. These verbal communications are processed by communications processor 216 to determine urgency 228. Over time, urgency 228 can change as additional verbal communications are processed.

For example, user 208 may say "I am on the highway, and my car has a flat tire." Situation 230 identified in verbal communication 212 is a flat tire situation. Verbal communications from user 208 about the flat tire are part of situation 230.

In this example, communications processor 216 generates audio communication 220 with natural language response 226. For example, audio communication 220 is "Please steer the car into the emergency lane. Please do not disconnect this call."

Further, communications processor 216 determines urgency 228 using verbal communication 212. Urgency 228 is identified as high urgency seen this illustrative example. Communications processor 216 selects frequency modulator 232 as a frequency modulator used for high urgency situations. Communications processor 216 modulates audio communication 220 using selected frequency modulator 236 and sends modulated audio communication 242 to user 208.

During situation 230, user 208 may then say at a later time "I have moved the car into the emergency lane . . . Can you send a tow truck or someone to change the tire?" This verbal communication is a subsequent verbal communication to verbal communication 212 for situation 230.

In response to the subsequent verbal communication, communications processor 216 generates a new audio communication with a natural language response that says "A road assistance vehicle is on the way."

Additionally, communications processor 216 determines urgency 228 has changed to normal urgency from high urgency and selects a new frequency modulator from the plurality of frequency modulators used for normal urgency situations. Communications processor 216 modulates the new audio communication using the newly selected frequency modulator. This new modulated audio communication is then sent to user 208.

In this manner, communications processor 216 can dynamically change the frequency modulators used to generate audio communications when urgency 228 changes during situation 230 for user 208. A similar change can be made for different situations.

In another illustrative example, communications processor 216 can also modulate amplitude 248 of words 240 in audio communication 220 in addition to or in place of frequency 238 using selected frequency modulator 236. Further, amplitude 248 can also be modulated differently for different situations based on the selection of a frequency modulator from the plurality of frequency modulators 234.

In the illustrative example, communications processor 216 is also capable of selecting a frequency modulator from the plurality of frequency modulators 234 based on characteristics of user 208. For example, communications processor 216 can determine language proficiency 250 for user 208. Language proficiency 250 is a measure of the ability of user 208 to speak or understand a particular language. Language proficiency 250 can take into account at least one of accuracy, fluency, vocabulary, or other factors spec to the ability of user 208 being able to speak a language. Language proficiency 250 can be different for different users based on an amount of experience or knowledge they have with a particular language.

Additionally, language proficiency 250 can also change based on age, physiological conditions, or environmental conditions. For example, user 208 may have a more difficult time hearing based on an age of user 208 or the environment. If user 208 is in a loud environment, language proficiency 250 may be lower than if a lower noise environment is present because of an inability of user 208. As the noise in the environment increases, the ability of user 208 to clearly hear and understand natural language responses in audio communications in the loud environment can be reduced.

In the illustrative example, language proficiency 250 for user 208 can be identified in a number of different ways. For example, results from a language proficiency test taken by user 208 can be used. In another illustrative example, verbal communications from user 208 can be analyzed by artificial intelligence system 218 to determine language proficiency 250. For example, natural language processes that include natural language understanding can analyze at least one of vocabulary, speech patterns, grammar, sentence structure, pronunciation, word choice, or other metrics in verbal communications from user 208.

In another illustrative example, the loud environment may result in a reduced ability of user 208 to understand audio communications generated by communications processor 216 with a particular frequency that would normally be appropriate for urgency 228. The response of user 208 can be used to identify a situation in which language proficiency 250 is lower than desired in the loud environment.

For example, the verbal communications made by user 208 can indicate that user 208 does not understand natural language responses in prior audio communications sent by communications processor 216. In other words, the verbal communications by user 208 can indicate if a desired level of understanding of natural language responses in the audio communications sent by communications processor 216 is absent. In one illustrative example, verbal communication 212 can be modulated to decrease frequency 238, increase amplitude 248, or both for audio communication 220 in an attempt to increase the comprehension of audio communications by user 208.

An adaptation or selection of words used in natural language responses in the audio communications can be made based on feedback on how well user 208 understands the natural language responses in the audio communications. For example, a simpler vocabulary can be used if the responses made by user 208 indicate that a desired level of comprehension of the audio communications is not present.

Communications processor 216 selects frequency modulator 232 from the plurality of frequency modulators 234 based on urgency 228 and language proficiency 250 to form selected frequency modulator 236. For example, language proficiency 250 can be used as a weighting factor.

For example, urgency 228 can be a value that corresponds to values for the plurality of frequency modulators 234. For example, if 7 frequency modulators are present, urgency 228 can have an integer value from 1 to 7 with 1 being for the frequency modulator having the highest frequency.

Language proficiency 250 can be used to adjust urgency 228. For example, a highest proficiency for language proficiency 250 can have a value of 0 while a below average score for language proficiency 250 can have a value of 3 and a poor score can have a value of 5. The value for language proficiency 250 is added to the value of urgency 228 and obtain an adjusted value for urgency 228 that corresponds to one of the frequency modulators. The adjusted value of urgency 228 in this example does not go above 7. Thus, this feature allows communications processor 216 to take into account language proficiency 250 of user 208 in comprehending the language used in natural language response 226.

For example, if language proficiency 250 of user 208 is lower than average for the language in audio communications 220, a lower urgency frequency modulator from the plurality of frequency modulators 234 can be selected instead of the frequency modulator that would be selected if the proficiency of user 208 for the language is average. The lower frequency causes words 240 in modulated audio communication 242 to be spoken slower to user 208. In this manner, communications processor 216 can also take into account language proficiency 250 for user 208 for the language used in natural language response 226 in communicating with user 208.

Further, communications processor 216 can generate natural language response 226 based on urgency 228 of situation 230 of user 208. For example, when urgency 228 is a low urgency situation, natural language response 226 can be more verbose and chatty as compared to when urgency 228 is a high urgency situation.

With a high urgency situation, natural language response 226 can be more concise and contain word choices less subject to misinterpretation. For example, natural language response 226 can use a nautical alphabet to spell out words that are important in a high urgency situation such that the words are less likely to be misunderstood.

In the illustrative examples, communications processor 216 can be used in various programs, products, interfaces, or other applications. For example, communications processor 216 can be used in audio-enabled interfaces, cognitive audio interfaces, virtual assistants, virtual avatars, tangible cognitive interfaces such as robots, or other physical or software applications.

Communications processor 216 can be implemented in software, hardware, firmware, or a combination thereof. When software is used, the operations performed by communications processor 216 can be implemented in program code configured to run on hardware, such as a processor unit. When firmware is used, the operations performed by communications processor 216 can be implemented in program code and data and stored in persistent memory to run on a processor unit. When hardware is employed, the hardware may include circuits that operate to perform the operations in communications processor 216.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with communicating with users based on an urgency for the users. As a result, one or more technical solutions may provide a technical effect of modulating audio communications sent to users in a manner that changes a frequency of the audio communications based on the urgency of the situations for the users.

One or more technical solutions provide a technical effect taking into account urgency in generating a natural language response in an audio communication. For example, one or more technical solutions modulate a natural language response in an audio communication to have a frequency based on the urgency for the user. One or more technical solutions modulates the frequency of words in the audio communication based on the urgency of the situation for the user. For example, one or more technical solutions increases a speed at which the words are spoken when the urgency of the situation is greater as compared to the speed at which the words are spoken when the urgency is lower.

As a result, computer system 204 operates as a special purpose computer system in which communications processor 216 in computer system 204 enables facilitating communications with users in a more effective manner based on the urgency for situations for the users. In particular, communications processor 216 transforms computer system 204 into a special purpose computer system as compared to currently available general computer systems that do not have communications processor 216.

The illustration of audio communications environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although not shown, a network is used to facilitate communications between computer system 204 and client device 206. This network can be similar to network 102 used in network data processing system 100 in FIG. 1. As another illustrative example, artificial intelligence system 218 can be a separate component from communications processor 216 instead being part of communications processor 216.

Figure 3:
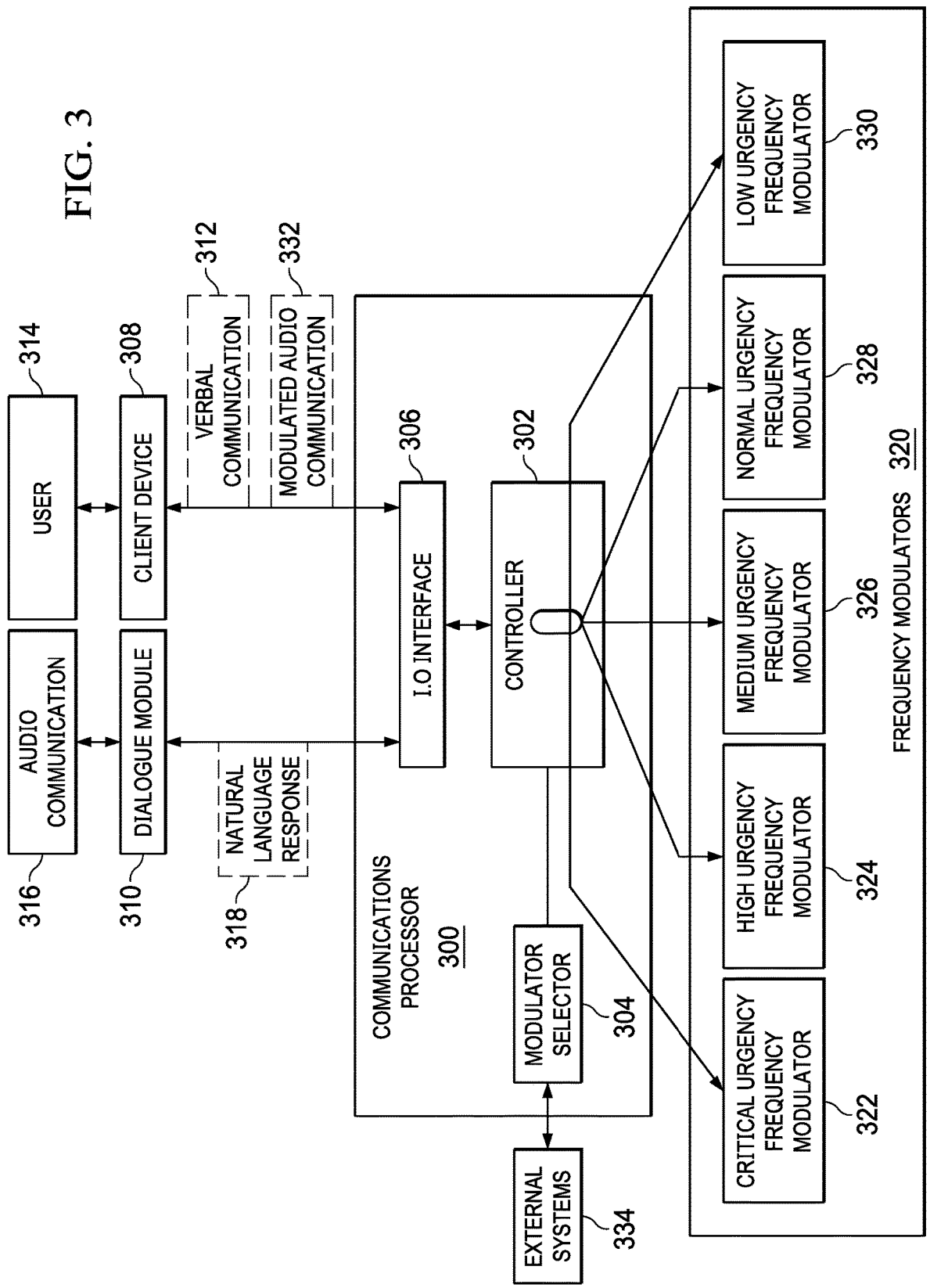
FIG. 3 is a diagram of a communications processor in accordance with an illustrative embodiment.

With reference next to FIG. 3, a diagram of a communications processor is depicted in accordance with an illustrative embodiment. As depicted, communications processor 300 is an example of an implementation for communications processor 216 in FIG. 2. In this illustrative example, communications processor 300 includes controller 302, modulator selector 304, and input/output (I/O) interface 306.

As depicted, input/output interface 306 facilitates communication with client device 308 and dialogue module 310. Input/output interface 306 comprises hardware and may include software. For example, input/output interface 306 can include at least one of a network interface card (NIC), a universal serial bus (USB) port, a shared memory, a bus system, or some other suitable interface that provides for the exchange of information between controller 302, client device 308, and dialogue module 310.

In this illustrative example, dialogue module 310 can be implemented using an artificial intelligence system. Dialogue module 310 analyzes verbal communication 312 received from user 314 utilizing client device 308 and generates audio communication 316 containing natural language response 318. Natural language response 318 is text using words that are structured in a manner that is understood and used by people to communicate with each other. For example, natural language response 318 may be in English, French, Spanish, Russian, or some other language spoken by people to communicate with each other. Audio communication 316 is the audio or spoken version of the text in natural language response 318.

As depicted, modulator selector 304 determines an urgency for audio communication 316. The urgency can be determined for user 314. For example, the urgency can be determined based on the situation of user 314. The situation can be determined from one or more circumstances for user 314. The situation can also include a location and an environment around user 314.

Based on the urgency identified, modulator selector 304 selects one of frequency modulators 320 to modulate audio communication 316. Controller 302 controls the selected frequency modulator to modulate audio communication 316, which results in modulated audio communication 332.

In this illustrative example, frequency modulators 320 comprise critical urgency frequency modulator 322, high urgency frequency modulator 324, medium urgency frequency modulator 326, normal urgency frequency modulator 328, and low urgency frequency modulator 330. Controller 302 returns modulated audio communication 332 to client device 308 using input/output interface 306.

The urgency can be determined by modulator selector 304 using verbal communication 312. As depicted, verbal communication 312 can be analyzed by modulator selector 304 in determining the urgency. Modulator selector 304 can analyze verbal communication 312 to identify at least one of an emotional state, a location, a time, and other information that may be used to determine the urgency for audio communication 316. For example, the emotional state of user 314 can be determined from at least one of inflection, intonation, voice pitch, speech pattern, words, or other information in verbal communication 312. Additionally, the urgency of the situation for user 314 can be determined from information about the environment obtained from verbal communication 312.

Additionally, modulator selector 304 can interface with external systems 334 to obtain information for use in determining the urgency for audio communication 316. For example, modulator selector 304 communicates with a work scheduler or a calendar system to determine how close an upcoming event is to the current time. As the upcoming event is closer in time, the urgency can increase. For example, user 314 can request a daily briefing. If a meeting is scheduled within five minutes, modulator selector 304 can select high urgency frequency modulator 324 for use in modulating audio communication 316 containing the daily briefing. If, however, the meeting is set for two hours later, modulator selector 304 selects low urgency frequency modulator 330 for use in modulating audio communication 316 containing the daily briefing.

In this illustrative example, modulator selector 304 can be implemented in a number of different ways. For example, modulator selector 304 can be implemented using at least one of an artificial intelligence system, a rules-based system, an expert system, or some other suitable mechanism.

The illustration of communications processor 300 is show for purposes of illustrating one manner in which communications processor 216 in FIG. 2 can be implemented and not meant to limit the manner in which communications processor 216 can be implemented in other examples. For example, in other illustrative examples, communications processor 300 can use 3 frequency modulators, 10 frequency modulators, or some other number of frequency modulators other than the 5 frequency modulators show in FIG. 3.

Figure 4:
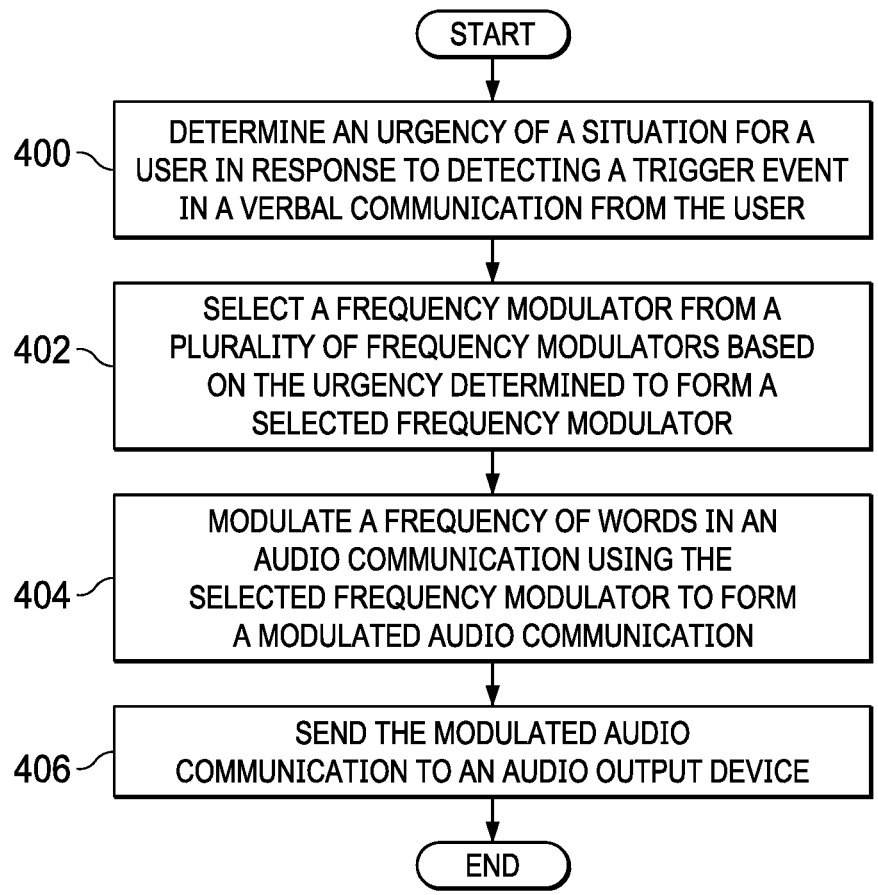
FIG. 4 is a flowchart of a process for generating an audio communication in accordance with an illustrative embodiment.

Turning next to FIG. 4, a flowchart of a process for generating an audio communication is depicted in accordance with an illustrative embodiment. The processes in FIG. 4 can be implemented in hardware, software, or both. When implemented in software, the processes can take the form of program code that is run by one of more processor units located in one or more hardware devices in one or more computer systems. For example, these processes can be implemented in communications processor 216 in computer system 203 in FIG. 2 or communications processor 300 in FIG. 3.

The process begins by determining an urgency of a situation for a user in response to detecting a trigger event in a verbal communication from the user (step 400). The process selects a frequency modulator from a plurality of frequency modulators based on the urgency determined to form a selected frequency modulator (step 402).

The process modulates a frequency of words in an audio communication using the selected frequency modulator to form a modulated audio communication (step 404). In step 404, the modulated audio communication comprises a natural language response generated in response to the trigger event. In the illustrative examples, the frequency is how fast the words are spoken in the audio response rather than how often a word is repeated in the audio response. The process sends the modulated audio communication to an audio output device (step 406). The process terminates thereafter.

Figure 5:
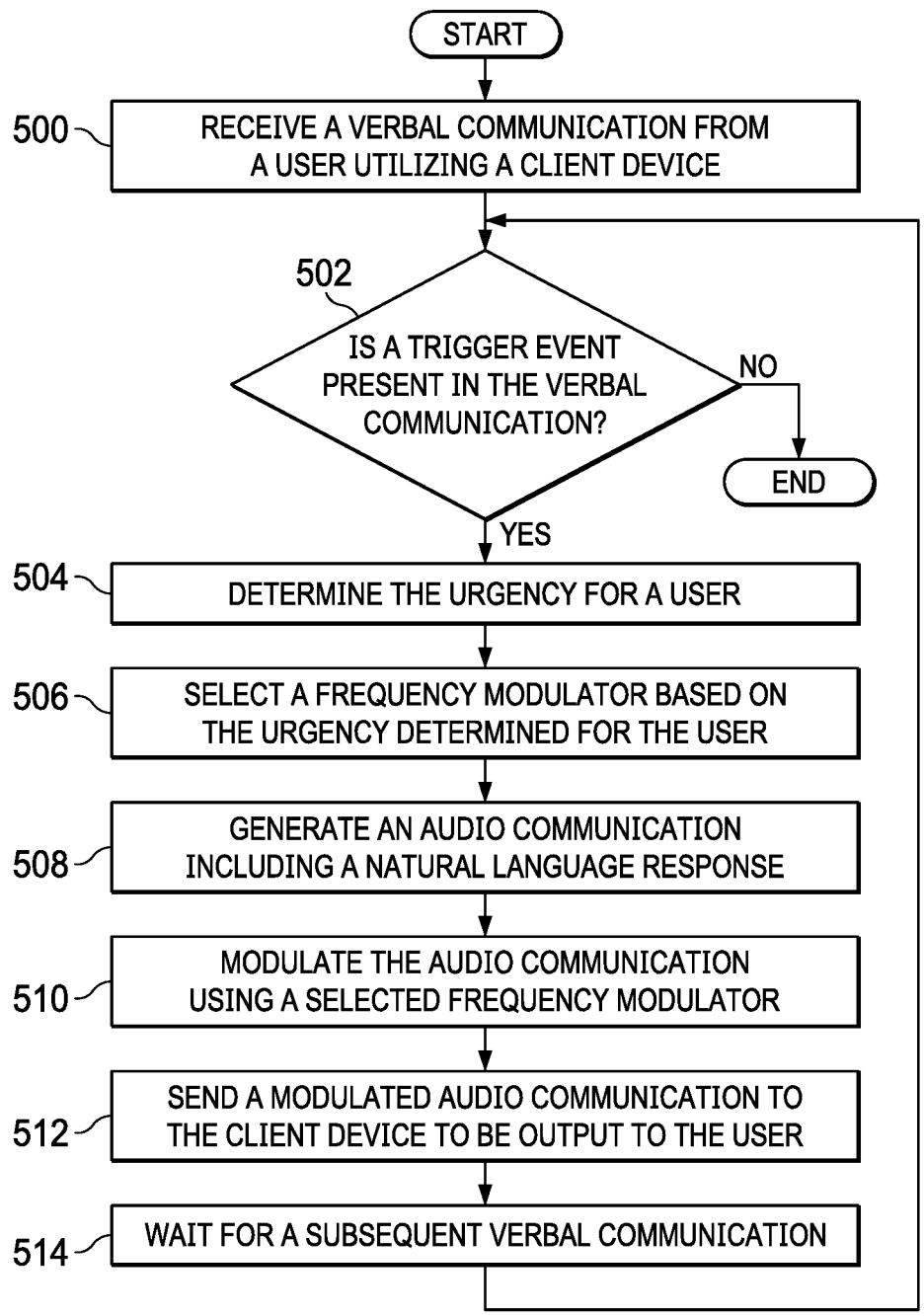
FIG. 5 is a flowchart of a process for generating audio communications in which an urgency for a user changes in accordance with an illustrative embodiment.

Turning next to FIG. 5, a flowchart of a process for generating audio communications in which an urgency for a user changes is depicted in accordance with an illustrative embodiment. The processes in FIG. 5 can be implemented in hardware, software, or both. When implemented in software, the processes can take the form of program code that is run by one of more processor units located in one or more hardware devices in one or more computer systems. For example, these processes can be implemented in communications processor 216 in computer system 203 in FIG. 2 or communications processor 300 in FIG. 3.

The process begins by receiving a verbal communication from a user utilizing a client device (step 500). A determination is made as to whether a trigger event is present in the verbal communication (step 502). If a trigger event is absent, the process terminates.

Otherwise, the process determines the urgency for a user (step 504). In step 504, the urgency can be determined using at least one of the verbal communication or from other information. For example, the other information may include a global positioning system (GPS) location received from a client device used by the user. This location is received as part of the verbal communication or as a separate piece of data. In another example, the location information may be received from a vehicle operated by the user. As yet another example, movement information received from the client device can be used to determine an urgency of the situation. In still other illustrative examples, biometric information can be used and obtained from the client device in the form of a smart watch.

The process selects a frequency modulator based on the urgency determined for the user (step 506). The process generates an audio communication including a natural language response (step 508). In this illustrative example, the wording, grammatical structure, language, or other characteristics of the natural language response generated in step 508 can be generated based on the urgency determined for the user.

The process modulates the audio communication using a selected frequency modulator (step 510). The process sends a modulated audio communication to client the device to be output to the user (step 512).

The process waits for a subsequent verbal communication (step 514). When the subsequent verbal communication is received, the process returns to step 502 as described above. In this manner, the process can select a new frequency modulator as the urgency changes for the user.

Figure 6:
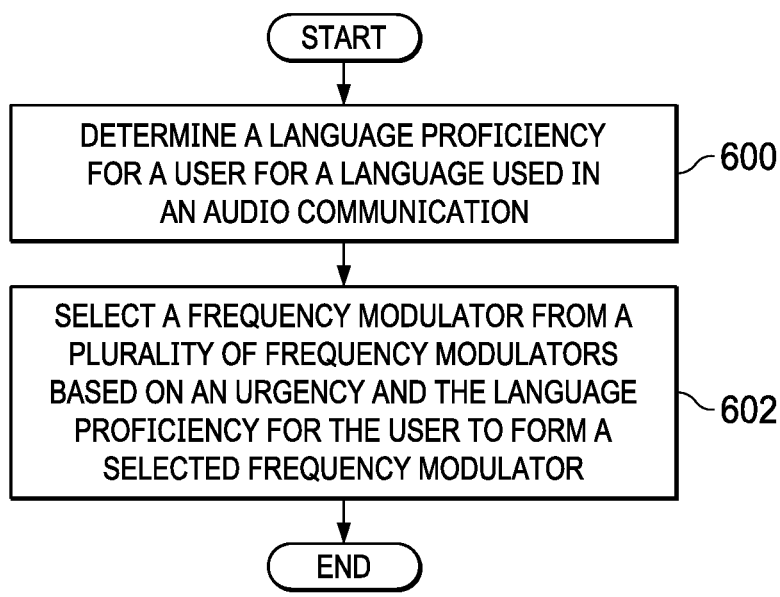
FIG. 6 is a flowchart of a process for selecting a frequency modulator taking into account language proficiency in accordance with an illustrative embodiment.

With reference now to FIG. 6, a flowchart of a process for selecting a frequency modulator taking into account language proficiency is depicted in accordance with an illustrative embodiment. The processes in FIG. 6 can be implemented in hardware, software, or both. When implemented in software, the processes can take the form of program code that is run by one of more processor units located in one or more hardware devices in one or more computer systems. For example, these processes can be implemented in communications processor 216 in computer system 203 in FIG.

2 or communications processor 300 in FIG. 3. This process is an example of an implementation of step 402 in FIG. 4 and step 506 in FIG. 5.

The process begins by determining a language proficiency for a user for a language used in an audio communication (step 600). The process selects a frequency modulator from a plurality of frequency modulators based on an urgency and the language proficiency for the user to form a selected frequency modulator (step 602). The process terminates thereafter.

Figure 7:
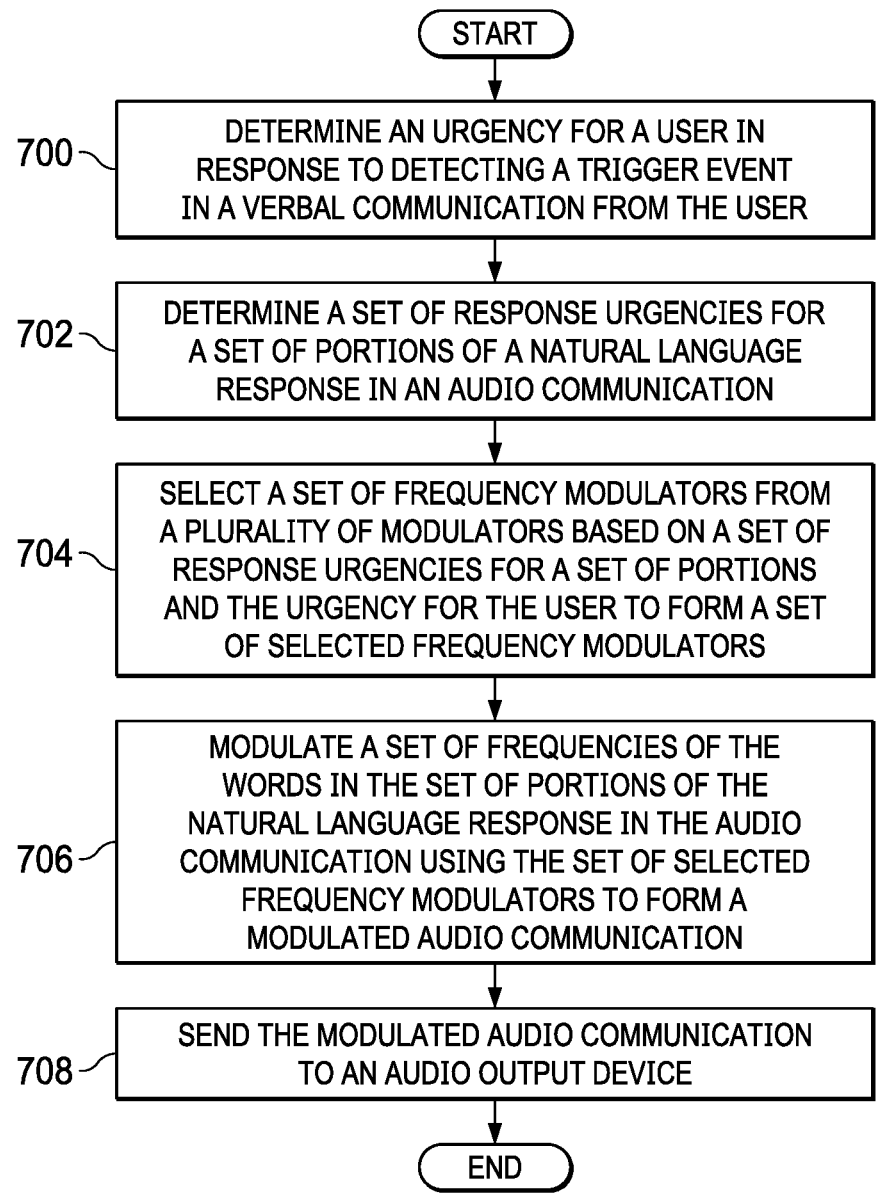
FIG. 7 is a flowchart of a process for selecting a set of frequency modulators in accordance with an illustrative embodiment.

With reference now to FIG. 7, a flowchart of a process for selecting a set of frequency modulators is depicted in accordance with an illustrative embodiment. The processes in FIG. 7 can be implemented in hardware, software, or both. When implemented in software, the processes can take the form of program code that is run by one of more processor units located in one or more hardware devices in one or more computer systems. For example, these processes can be implemented in communications processor 216 in computer system 203 in FIG. 2 or communications processor 300 in FIG. 3. This process is similar to the process in FIG. 4 in which step 402 and step 404 are not performed when taking into account that portions of a natural language response may have different urgencies for presentation to a user. These urgencies for the portions of the natural language response are referred to as response urgencies. As depicted, different portions of the natural language response in an audio communication can be modulated differently based on the urgency for each portion of the natural language response.

The process begins by determining an urgency for a user in response to detecting a trigger event in a verbal communication from the user (step 700). The process determines a set of response urgencies for a set of portions of a natural language response in an audio communication (step 702). As used herein, "a set of," when used with reference to items, means one or more items. For example, "a set of response urgencies" is one or more response urgencies.

The process selects a set of frequency modulators from a plurality of modulators based on a set of response urgencies for a set of portions and the urgency for the user to form a set of selected frequency modulators (step 704). The process modulates a set of frequencies of words in the set of portions of the natural language response in the audio communication using the set of selected frequency modulators to form a modulated audio communication (step 706). The process sends the modulated audio communication to an audio output device (step 708). The process terminates thereafter.

For example, when a user says "I am on the highway, and my car has a flat tire," this verbal communication has a critical urgency. The natural language response is "Please steer the car into the emergency lane. Please do not disconnect the call." Using the process in FIG. 7, the frequency modulators are selected based on the set of response urgencies in the natural language response in the urgency for the user.

In this illustrative example, a first portion of the natural language response, "Please steer the car into the emergency lane," is modulated using a critical frequency modulator while a second portion of natural language response, "Please do not disconnect this call," is modulated using a normal modulator, which is at a lower level or urgency as compared to the first portion. The urgency determined for the user and the response urgencies for the different portions of the natural language response are used to select the set of frequency modulators. For example, the urgency determined for the user can be used as the ceiling or highest level frequency modulator that can be selected using the response urgencies for the portions of the natural language response. In some illustrative examples, the set of frequency modulators can be selected without taking into account the urgency for the user.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram. For example, step 506 and step 508 can be performed in reverse order or at substantially the same time.

Figure 8:
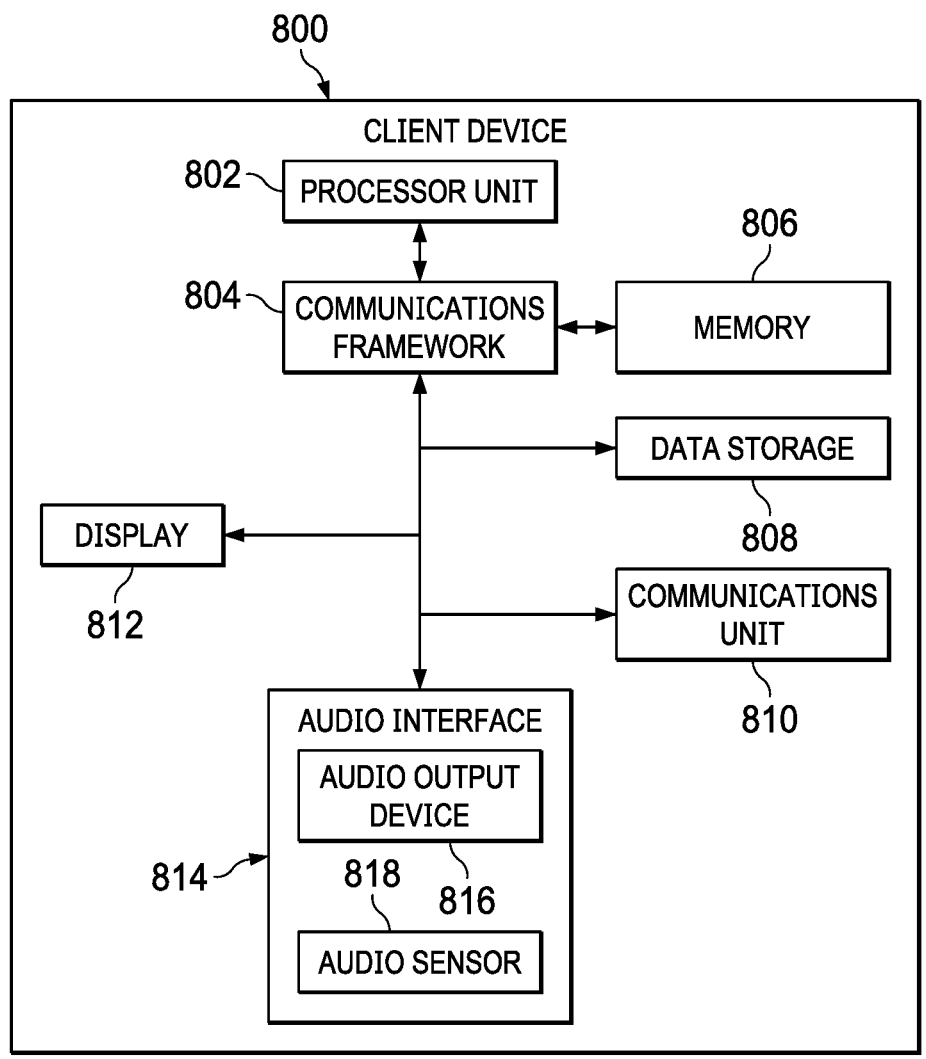
FIG. 8 is a block diagram of a client device in accordance with an illustrative embodiment.

With reference to FIG. 8, a block diagram of a client device is depicted in accordance with an illustrative embodiment. Client device 800 is an example of one manner in which client device 206 in FIG. 2 can be implemented for facilitating audio communications. In this illustrative example, client device 800 includes physical hardware components such as processor unit 802, communications framework 804, memory 806, data storage 808, communications unit 810, display 812, and audio interface 814.

Communications framework 804 allows different components in client device 800 to communicate with each other when connected to communications framework 804. Communications framework 804 is a bus system in this illustrative example.

Processor unit 802 processes program code for software loaded into memory 806. Processor unit 802 include one or more processors. For example, processor unit 802 can be selected from at least one of a multicore processor, a central processing unit (CPU), a graphics processing unit (GPU), a physics processing unit (PPU), a digital signal processor (DSP), a network processor, or some other suitable type of processor.

Memory 806 is connected to processor unit 802 through communications framework 804. As depicted, memory 806 can include at least one of a random access memory (RAM), a read-only memory (ROM), a static random access memory (SRAM), a dynamic random access memory (DRAM), or other suitable types of memory devices or circuits.

As depicted, data storage 808 is connected to communications framework 804 and can store data, program code, or other information. Instructions in program code can be loaded from data storage 808 into memory 806 for processing by processor unit 802. Data storage 808 can comprise at least one of a hard disk drive, a flash drive, a solid-state disk drive, an optical drive, or some other suitable type of data storage device or system.

In this illustrative example, communications unit 810 provides for communications with other data processing systems or devices. In these illustrative examples, communications unit 910 includes at least one of a network interface card, a wireless communications device, a universal serial bus port, or other suitable device.

Display 812 is connected to communications framework 804 and provides a mechanism to display information to a user. In this example, display 812 can be a touch screen display, which enables receiving user input through this display.

In this illustrative example, audio interface 814 is connected to communications framework 804. As depicted, audio interface 814 can include hardware, software, or both that control the operation of audio output device 816 and audio sensor 818 in audio interface 814. Audio output device 816 is hardware that is capable of generating audio signals for output and can include at least one of a paper cone speaker, an audio transducer, a line out jack, a digital to analog converter (DAC), or other type of audio device. Audio sensor 818 is hardware that is capable of detecting sounds. For example, audio sensor 818 can be comprised of at least one of a microphone, a fiber-optic microphone, a laser microphone, a microelectronic mechanical system (MEMS), a transducer, a line input jack and associated circuitry, or an analog to digital converter (ADC).

The illustration of client device 800 is an example of one manner in which client device 800 can be implemented. This illustration is not meant to limit the manner in which client device 800 can be embodied in other illustrative examples. For example, audio output device 816 and audio sensor 818 can be implemented as a single component. When audio output device 816 is a loud speaker, audio sensor 818 can also be implemented using the loud speaker.

Figure 9:
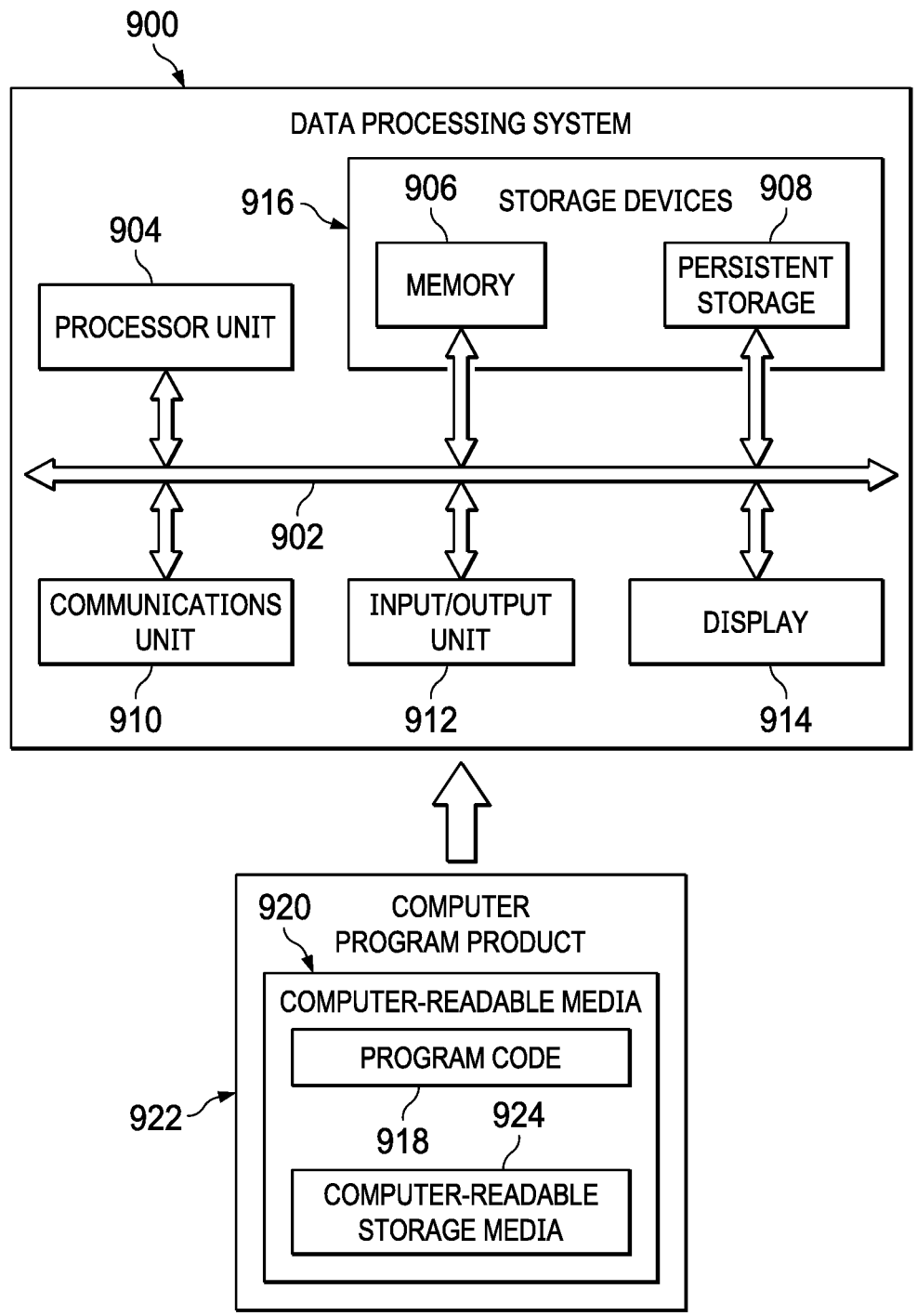
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement computer system 204 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 processes instructions for software that can be loaded into memory 906. Processor unit 904 include one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for processing by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 900 are not meant to provide architectural limitations to the manner in which different embodiments can be implemented. In some illustrative examples, one or more of the components may be incorporated in or otherwise form a portion of, another component. For example, the 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Thus, the illustrative embodiments of the present invention provide a computer-implemented method, computer system, and computer program product for generating an audio communication. An urgency for a user is determined by a computer system in response to detecting a trigger event in a verbal communication from the user. A frequency modulator is selected by the computer system from a plurality of frequency modulators based on the urgency determined to form a selected frequency modulator. A frequency of words in an audio communication is modulated by the computer system using the selected frequency modulator to form a modulated audio communication, wherein the modulated audio communication comprises a natural language response generated in response to the trigger event. The modulated audio communication is sent by the computer system to an audio output device.

In the different illustrative examples, the urgency for a user can be determined. This determination can be made by determining the situation the user and the urgency of the situation. The frequency modulator can be selected and used to modulate the natural language response in the audio communication to provide a frequency that is appropriate for the urgency of the situation for the user.

In yet other illustrative examples, one or more frequency modulators can be selected to modulate the natural language response in the audio communication based on the urgency of one or more portions of the natural language response. In still other illustrative examples, an amplitude of the audio communications can also be modulated based on the urgency. Further, the selection of the frequency modulator can change as the urgency changes. For example, the urgency within a situation such as a flat tire can change from critical to normal depending on where the user is located and whether the user has stopped the vehicle. In this manner, the audio communication can have a frequency that changes as the urgency in the situation where the user changes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for generating an audio communication, the method comprising: determining, by a computer system, an urgency for a user in response to detecting a trigger event in a verbal communication from the user; selecting, by the computer system, a frequency modulator from a plurality of frequency modulators based on the urgency determined to form a selected frequency modulator; modulating, by the computer system, a frequency of words in an audio communication using the selected frequency modulator to form a modulated audio communication, wherein the modulated audio communication comprises a natural language response generated in response to the trigger event; and sending, by the computer system, the modulated audio communication to an audio output device; wherein selecting, by the computer system, the frequency modulator from the plurality of frequency modulators based on the urgency to form the selected frequency modulator comprises: determining a language proficiency for the user for a language used in the audio communication; and selecting, by the computer system, the frequency modulator from the plurality of frequency modulators based on the urgency and the language proficiency for the user to form the selected frequency modulator.

2. The method of claim 1 further comprising:
selecting, by the computer system, a new frequency modulator from the plurality of frequency modulators when the urgency changes for the user.

3. The method of claim 1 further comprising:
modulating, by the computer system, an amplitude of the words in the audio communication in addition to the frequency using the selected frequency modulator.

4. The method of claim 1 further comprising:
generating, by the computer system, the natural language response based on the urgency for the user.

5. The method of claim 1 further comprising:
determining, by the computer system, a set of response urgencies for a set of portions of the natural language response in the audio communication;
wherein selecting, by the computer system, the frequency modulator modulating step comprises selecting, by the computer system, a set of frequency modulators from the plurality of frequency modulators based on the set of response urgencies for the set of portions and the urgency for the user to form a set of selected frequency modulators; and
wherein modulating, by the computer system, the frequency of the words in an audio communication using the selected frequency modulator comprises modulating, by the computer system, a set of frequencies of the words in the set of portions of the natural language response in the audio communication using the set of selected frequency modulators selected to form the modulated audio communication.

6. The method of claim 1, wherein determining, by the computer system, the urgency for the user in response to detecting the trigger event in the verbal communication from the user comprises:
determining, by the computer system, the urgency based on a situational context for the user in a situation in response to detecting the trigger event in the verbal communication from the user.

7. The method of claim 1, wherein the trigger event is selected from at least one of a key phrase by spoken the user, an emergency call made by the user, a wake word spoken by the user, or a gesture made by the user.

8. An audio communications system comprising: a computer system that determines an urgency for a user in response to detecting a trigger event in a verbal communication from the user; selects a frequency modulator from a plurality of frequency modulators based on the urgency determined to form a selected frequency modulator; modulates a frequency of words in an audio communication using the selected frequency modulator to form a modulated audio communication, wherein the modulated audio communication comprises a natural language response generated in response to the trigger event; and sends the modulated audio communication to an audio output device; wherein in selecting the frequency modulator from the plurality of frequency modulators based on the urgency to form the selected frequency modulator, the computer system determines a language proficiency for the user for a language used in the audio communication; and selects the frequency modulator from the plurality of frequency modulators based on the urgency, and the language proficiency for the user to form the selected frequency modulator.

9. The audio communications system of claim 8, wherein the computer system selects a new frequency modulator from the plurality of frequency modulators when the urgency changes for the user.

10. The audio communications system of claim 8, wherein the computer system modulates an amplitude of the words in the audio communication in addition to the frequency using the selected frequency modulator.

11. The audio communications system of claim 8, wherein the computer system generates the natural language response based on the urgency for the user.

12. The audio communications system of claim 8, wherein the computer system determines a set of response urgencies for a set of portions of the natural language response in the audio communication; wherein selects the frequency modulator comprises selects a set of frequency modulators from the plurality of frequency modulators based on the set of response urgencies for the set of portions and the urgency for the user to form a set of selected frequency modulators; and wherein modulates the frequency of the words in an audio communication using the selected frequency modulator comprises modulates a set of frequencies of the words in the set of portions of the natural language response in the audio communication using the set of selected frequency modulators selected to form the modulated audio communication.

13. The audio communications system of claim 12, wherein in determining the urgency for the user in response to detecting the trigger event in the verbal communication from the user, the computer system determines the urgency based on a situational context for the user in a situation in response to detecting the trigger event in the verbal communication from the user.

14. The audio communications system of claim 8, wherein the trigger event is selected from at least one of a key phrase by spoken the user, an emergency call made by the user, a wake word spoken by the user, or a gesture made by the user.

15. A computer program product for generating an audio communication, the computer program product comprising: a computer-readable storage media; first program code, stored on the computer-readable storage media, for determining an urgency for a user in response to detecting a trigger event in a verbal communication from the user; second program code, stored on the computer-readable storage media, for selecting a frequency modulator from a plurality of frequency modulators based on the urgency determined to form a selected frequency modulator; third program code, stored on the computer-readable storage media, for modulating a frequency of words in an audio communication using the selected frequency modulator to form a modulated audio communication, wherein the modulated audio communication comprises a natural language response generated in response to the trigger event; and fourth program code, stored on the computer-readable storage media, for sending the modulated audio communication to an audio output device: wherein selecting the frequency modulator from the plurality of frequency modulators based on the urgency to form the selected frequency modulator comprises: determining a language proficiency for the user for a language used in the audio communication; and selecting, by the computer system, the frequency modulator from the plurality of frequency modulators based on the urgency and the language proficiency for the user to form the selected frequency modulator.

16. The computer program product of claim 15 further comprising:
fifth program code, stored on the computer-readable storage media, for selecting a new frequency modulator from the plurality of frequency modulators when the urgency changes for the user.

17. The computer program product of claim 15 further comprising:
fifth program code, stored on the computer-readable storage media, for modulating an amplitude of the words in the audio communication in addition to the frequency using the selected frequency modulator, wherein the audio communication comprises a natural language response.

18. The computer program product of claim 15 further comprising:
fifth program code, stored on the computer-readable storage media, for generating the natural language response based on the urgency for the user.

\* \* \* \* \*